United States Patent [19]

Schulze

[11] 4,253,612
[45] Mar. 3, 1981

[54] SPREADER FOR CINDERS AND THE LIKE

[76] Inventor: Clayton E. Schulze, Box 135, Corry, Pa. 16407

[21] Appl. No.: 69,582

[22] Filed: Aug. 24, 1979

[51] Int. Cl.³ .............................................. A01C 19/00
[52] U.S. Cl. ................................... 239/672; 222/610; 414/523
[58] Field of Search ................ 414/308, 523; 198/550, 198/554, 555, 616; 222/609, 610; 239/672, 674, 675, 683, 687

[56] References Cited

U.S. PATENT DOCUMENTS

| | | | |
|---|---|---|---|
| 2,779,508 | 1/1957 | Ensinger | 222/609 |
| 2,791,339 | 5/1957 | Sprague | 414/523 X |
| 3,322,429 | 5/1967 | Cervelli | 198/554 X |
| 3,329,436 | 7/1967 | Fyrk | 239/672 |
| 3,441,225 | 4/1969 | Cotter et al. | 239/687 X |
| 3,559,894 | 2/1971 | Murray et al. | 239/672 |
| 3,768,737 | 10/1973 | Tobias | 239/675 X |

*Primary Examiner*—Andres Kashnikow
*Attorney, Agent, or Firm*—Ralph Hammar

[57] ABSTRACT

Apparatus for spreading granular material such as salt, cinders and the like in which the conveyor is an assembly insertable into the hopper and the drive for the conveyor and spreader are mounted on the assembly. The conveyor assembly rests on the bottom wall of the hopper. The discharge of material starts at the rear wall of the hopper. The result is a reduction in the weight, height and length and a lowering of the center of gravity of the apparatus.

10 Claims, 4 Drawing Figures

SPREADER FOR CINDERS AND THE LIKE

This invention is intended to reduce the size and weight and lower the center of gravity of a spreader for salt, cinders and the like without reducing the capacity. This permits the use of the spreader with smaller size trucks and trailers which have heretofore been excluded from this class of work.

Figure 1:
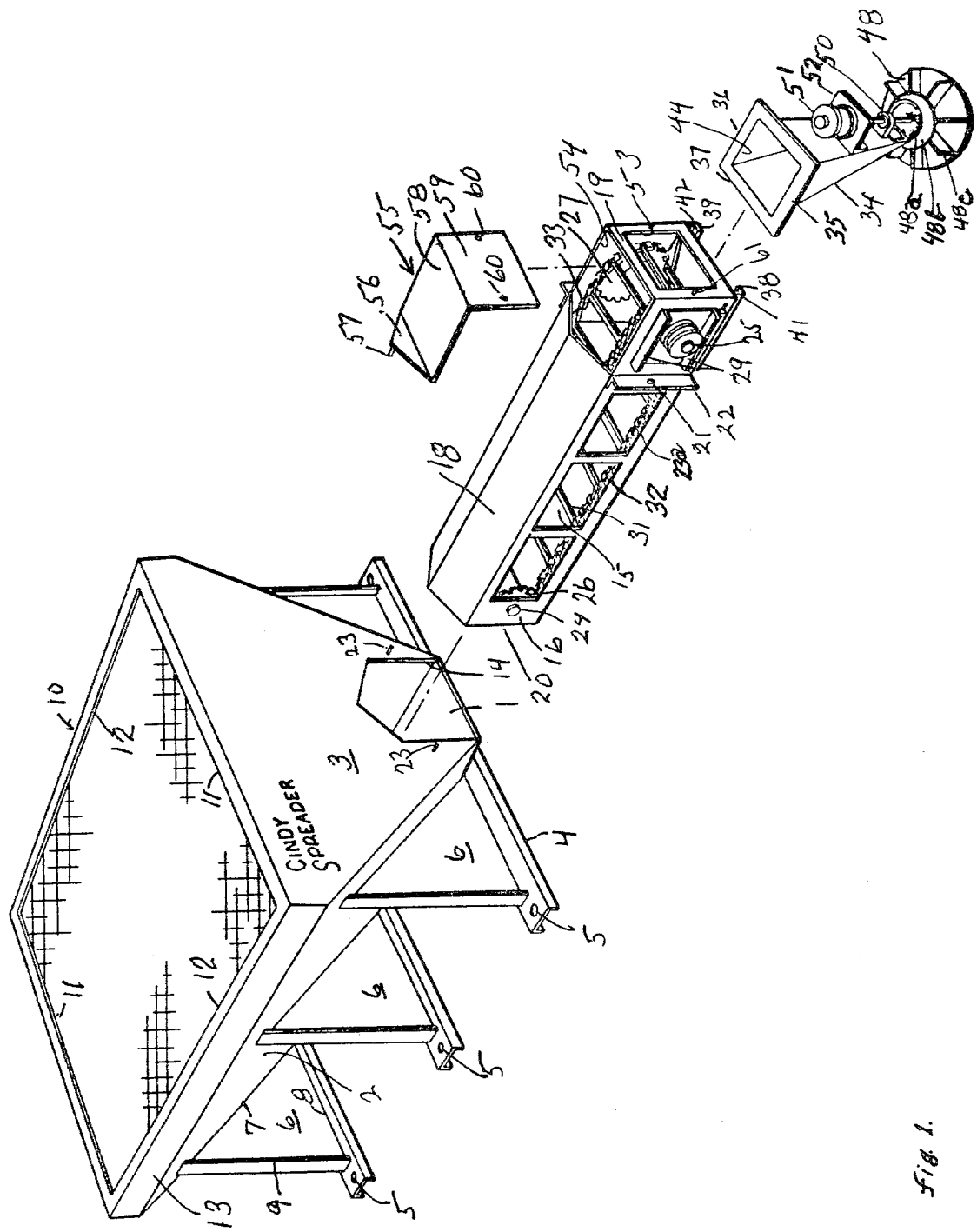
FIG. 1 is an exploded view of the spreader.
Figure 2:
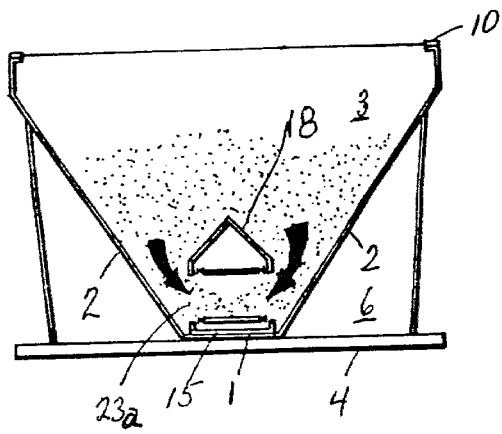
FIG. 2 is a sectional end elevation of the conveyor.
Figure 3:
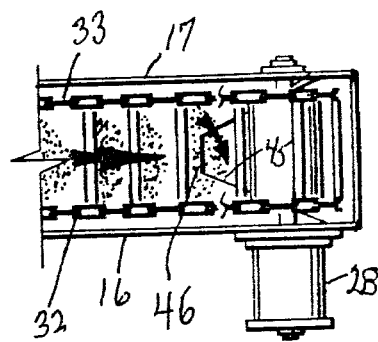
FIG. 3 is a diagrammatic plan of the delivery end of the conveyor.
Figure 4:
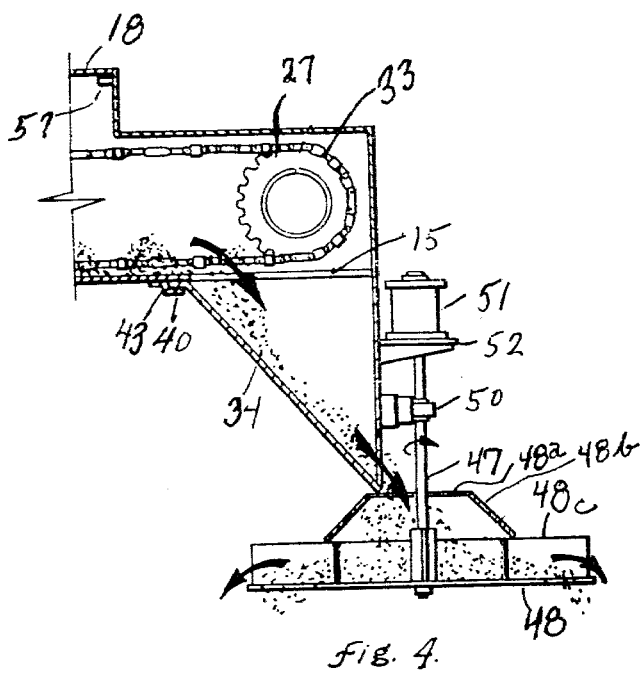
FIG. 4 is a sectional side elevation of the delivery end of the conveyor and the associated spreader.

Referring to the drawing, the hopper has a substantially flat rectangular bottom wall 1. At the longitudinal edges of the bottom wall are outwardly inclined side walls 2 joined to vertical end walls 3 upstanding from opposite ends of the bottom wall. The hopper is adapted to be mounted on the bed or frame of a truck and for this purpose any suitable structure may be provided such as cross channels 4 welded to the underside of the bottom wall 1. Bolt holes 5 are provided in the outer ends of the channels. Triangular stiffening elements or gussets 6 have adjacent edges 7, 8 welded to the inclined side walls and to the channels. Stiffening flanges are provided on the edges 9 of the gussets. At the top of the hopper is an inwardly extending rim 10 having end sections 11 united with the end walls 3 and having longitudinal side sections 12 united to vertical walls 13 extending from the upper edges of the inclined side walls 2. The outer end wall 3 normally mounted at the rear of the truck bed has an opening 14 for receiving a conveyor assembly, which will now be described.

The conveyor assembly has a housing with a bottom wall 15, laterally spaced upstanding side walls 16, 17 and angular top wall or roof 18 and an end wall 19. The housing has a sliding fit in the opening 14 with the bottom wall 15 of the housing resting on the bottom wall 1 of the hopper and the walls 16, 17, 18 conforming to the sides and top of the opening 14. When the housing is inserted, the inboard end 20 of the housing stops adjacent the inner end wall 3 and openings 21 in flanges 22 of vertical angles fixed to the walls 16 and 17 receive studs 23 fixed to the outer end wall 3 so that when nuts are tightened on the studs 23, the flanges 21 are clamped solidly against the outer end wall 3 of the hopper. In the side walls 16 and 17 are openings 23a which permit the flow into the housing of the material to be spread. The top member 18 of the housing blocks direct flow into the housing from the top and protects the conveyor from the weight of overlying material. All of the material must enter through the side openings 23a and therefore cannot rise above the level of such openings. At both ends of the housing are shafts 24, 25 carrying sprockets 26, 26 and 27, 27 adjacent the inner surface of the side walls. The shaft 25 is driven by a motor 28 supported by brackets on the wall 16. The sprockets 26, 26 and 27, 27 are held in alignment with each other by shafts 24, 25. The conveyor comprises drag bars 31 connected at opposite ends to chains 32, 33. Only the bars on the lower reach of the chains are effective for moving material. These bars ride on the bottom wall 15 of the conveyor housing. At the discharge end of the housing is a chute 34 having flanges 35, 36, 37 respectively received on flanges 38, 39, 40 of Z bars 41, 42, 43 fixed to the underside of the conveyor housing. When the flanges 35, 36, 37 are locked in place, opening 44 at the top of the chute is in position to receive the material discharged through V shaped opening 45. The apex 46 of the discharge opening is adjacent the bottom wall 1 of the hopper. The purpose of the V shaped discharge opening is to distribute the discharge starting with the material at the center of the drag bars 31 and working outward to the opposite ends of the drag bars.

The material falling in the upper end of the chute 34 falls into the open center 48a of a dispersion hopper or inverted cone 48b fixed to the upper edges of blades 48c on a rotating distributor disc 48 at the lower end of a shaft 47 journaled in a bracket 50 on the chute and driven by motor 51 carried by a bracket 52 also mounted on the chute. The inverted hollow cone 48b holds the material within the cone and on the disc 48 when the disc is not rotating. The inner edges of the blades 48c are spaced radially outward from the shaft 47 so the material falling through the opening 48a does not bounce off the blades but falls onto the disc 48 from which it is uniformly distributed. When the disc is rotated, the material is thrown outward between the blades on fins 48c is an even spread. The structure eliminates the need for flaps for controlling the flow of material.

In the projecting outer end of the conveyor housing are access openings 53 and 54 respectively in the outer end and in the top of the housing. These access openings are closed by a removable plate 55 having a section 56 registering with the outer end of the angular section 18 of the conveyor housing and having a pin 57 fitting inside the apex of the angular section so as to center the cover plate. The removable plate also has a horizontal section 58 covering the top access opening 54 and a vertical end section 59 covering the end access opening 53. The end section has holes 60 for receiving studs 61 by which the cover plate 55 is bolted in place.

The structure of the hopper results in a lower center of gravity because the conveyor, which normally depends below the hopper and must rest on the bed of the truck, is within the hopper. This reduces the height of the hopper-conveyor combination, or stated differently, permits the carrying of a greater load for a given height limitation. This also eliminates all problems of leakage of material along the length of the conveyor. The conveyor discharges closer to the hopper. No special structure is required to hold the material between the bars of the conveyor. As soon as the bars of the lower reach of the conveyor pass over the discharge opening 45, the material between the bars drops into the chute 34. The overall length of the hopper-conveyor assembly is less than required for conventional structure where the material is discharged from the upper reach of the conveyor.

I claim:

1. Apparatus for spreading granular materials, comprising a hopper adapted to be mounted on and extend longitudinally of a truck or trailer, said hopper having a substantially flat bottom wall, side walls diverging outward and upward from longitudinal edges of the bottom wall and end walls connected between said bottom wall and said side walls, one of said end walls having an opening registering with said bottom wall through which material may be removed, a conveyor housing with its inboard end insertable into the hopper through said opening and with its outboard end projecting outward from said opening, said housing having a bottom wall resting on the bottom wall of the hopper, a drag bar conveyor in said housing with bars extending between two chains, the bars of the lower reach of the conveyor riding on the bottom wall of the housing and moving toward and through said opening, means for protecting the conveyor from the overlying weight of material, a distributor for the material, and a chute leading from the housing adjacent the bottom wall of said hopper to said distributor.

2. The structure of claim 1 having a motor on the outboard end of the housing for driving the conveyor.

3. The structure of claim 1 having brackets fastened to said one end wall for holding the housing in place.

4. The structure of claim 1 in which the means for protecting the conveyor comprises a top wall of said housing.

5. The structure of claim 1 in which the housing has side walls with openings for flow of material into the housing.

6. The structure of claim 1 having a motor supported on the outboard end of the housing for driving the distributor.

7. The structure of claim 1 having an outwardly diverging outlet from the conveyor to the chute.

8. The structure of claim 1 in which the bars of the lower reach pass over a discharge opening in the bottom wall of the housing.

9. The structure of claim 8 in which the opening is V shaped with the bars of the lower reach first passing over the apex of the V.

10. The structure of claim 1 in which the distributor has a disc with vanes on its upper surface and a hollow cone mounted on said vanes and having an open top receiving material from said chute, said cone diverging outward toward said disc and holding material on said disc when the disc is not rotating.

* * * * *